United States Patent
Llop

(10) Patent No.: US 11,666,420 B2
(45) Date of Patent: Jun. 6, 2023

(54) DENTAL ABUTMENT CAP ASSEMBLY

(71) Applicant: NATIONAL DENTEX, LLC, Palm Beach Gardens, FL (US)

(72) Inventor: Daniel R. Llop, Cornelius, NC (US)

(73) Assignee: NATIONAL DENTEX, LLC, Jupiter, FL (US)

(*) Notice: Subject to any disclaimer, the term of this patent is extended or adjusted under 35 U.S.C. 154(b) by 554 days.

(21) Appl. No.: 16/704,355

(22) Filed: Dec. 5, 2019

(65) Prior Publication Data

US 2020/0197134 A1 Jun. 25, 2020

Related U.S. Application Data

(60) Provisional application No. 62/783,288, filed on Dec. 21, 2018.

(51) Int. Cl.
*A61C 8/00* (2006.01)

(52) U.S. Cl.
CPC ............ *A61C 8/0066* (2013.01); *A61C 8/008* (2013.01); *A61C 8/0059* (2013.01); *A61C 8/0068* (2013.01); *A61C 8/0093* (2013.01)

(58) Field of Classification Search
CPC ... A61C 8/0066; A61C 8/0059; A61C 8/0068; A61C 8/008; A61C 8/0093; A61C 8/0069; A61C 8/006; A61C 8/005; A61C 8/0048
USPC ...................................... 433/174–176, 201.1
See application file for complete search history.

(56) References Cited

U.S. PATENT DOCUMENTS

| | | | | |
|---|---|---|---|---|
| 5,482,463 | A * | 1/1996 | Wilson, Jr. | ........... A61C 8/0054 |
| | | | | 433/173 |
| 6,332,777 | B1 * | 12/2001 | Sutter | .................... A61C 8/005 |
| | | | | 433/214 |
| 6,915,178 | B2 | 7/2005 | O'Brien et al. | |
| 8,200,462 | B2 | 6/2012 | Marshall et al. | |
| 8,769,822 | B2 | 7/2014 | Warden et al. | |
| 9,173,723 | B2 | 11/2015 | Harrison | |
| 9,226,801 | B2 | 1/2016 | Groscurth et al. | |
| 9,408,678 | B2 | 8/2016 | Harrison | |
| 9,498,307 | B2 | 11/2016 | Harrison | |
| 9,504,533 | B2 | 11/2016 | Groscurth et al. | |
| 9,554,879 | B2 | 1/2017 | Harrison | |
| 2009/0298008 | A1 | 12/2009 | Groscurth et al. | |
| 2010/0124731 | A1 | 5/2010 | Groscurth et al. | |
| 2010/0311013 | A1 * | 12/2010 | Niznick | ............... A61C 8/0001 |
| | | | | 433/174 |
| 2011/0045431 | A1 | 2/2011 | Groscurth et al. | |

(Continued)

FOREIGN PATENT DOCUMENTS

| FR | 3067588 A1 * | 12/2018 | ......... A61C 13/0001 |
|---|---|---|---|
| WO | WO-2014081843 A1 * | 5/2014 | ............. A61B 6/032 |
| WO | WO-2016012581 A1 * | 1/2016 | ............. A61C 1/084 |

OTHER PUBLICATIONS

Calvat et al., Dental restorative set (specification translation), Dec. 21, 2018 (Year: 2018).*

*Primary Examiner* — Ralph A Lewis
*Assistant Examiner* — Mirayda A Aponte
(74) *Attorney, Agent, or Firm* — Frost Brown Todd LLP

(57) ABSTRACT

An apparatus includes a dental prosthetic, a metallic insert, and a plastic cap member. The insert is configured to be bonded in an interior of the dental prosthetic. The insert defines a passageway. The of the insert is configured to receive a screw. The cap member is configured to be interposed between the insert and the interior of the dental prosthetic.

18 Claims, 11 Drawing Sheets

(56) References Cited

U.S. PATENT DOCUMENTS

| | | |
|---|---|---|
| 2011/0045432 A1 | 2/2011 | Groscurth et al. |
| 2012/0077150 A1* | 3/2012 | Goodman ............ A61C 8/0077 433/173 |
| 2015/0173865 A1* | 6/2015 | Fischler ............... A61C 8/0048 433/173 |
| 2016/0106517 A1 | 4/2016 | Groscurth et al. |
| 2016/0324599 A1 | 11/2016 | Harrison |
| 2017/0071697 A1 | 3/2017 | Groscurth et al. |
| 2017/0112592 A1 | 4/2017 | Groscurth et al. |
| 2018/0036103 A1 | 2/2018 | Llop |
| 2018/0271626 A1* | 9/2018 | Brown ................. A61C 8/0065 |

* cited by examiner

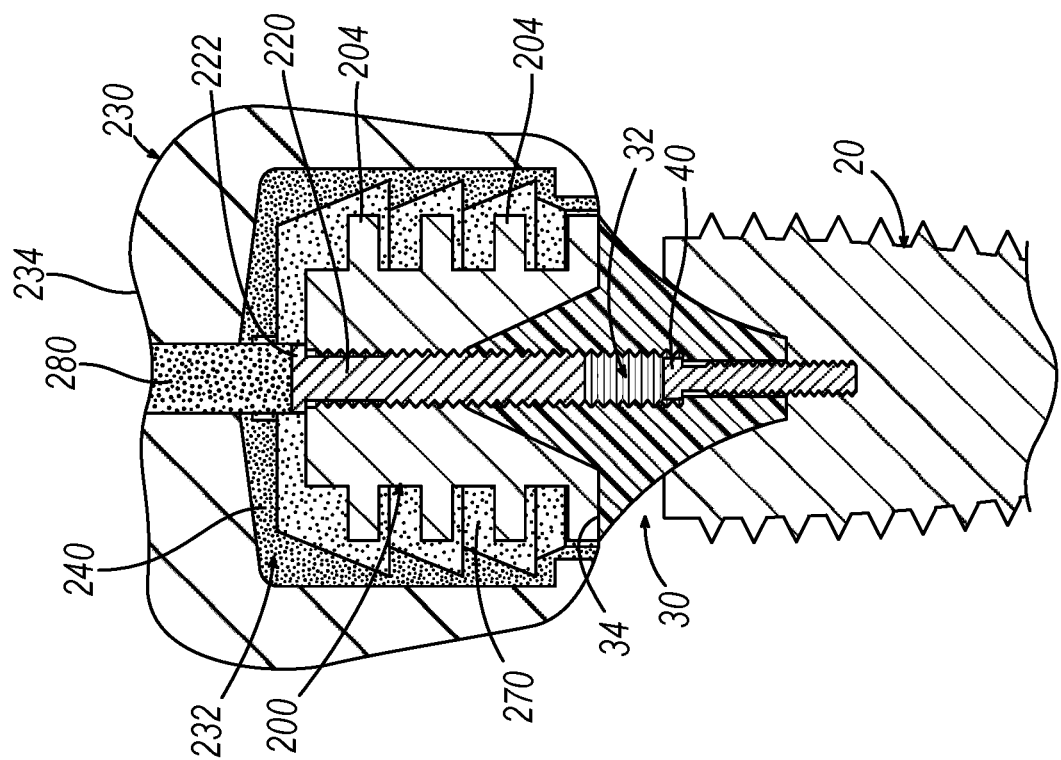
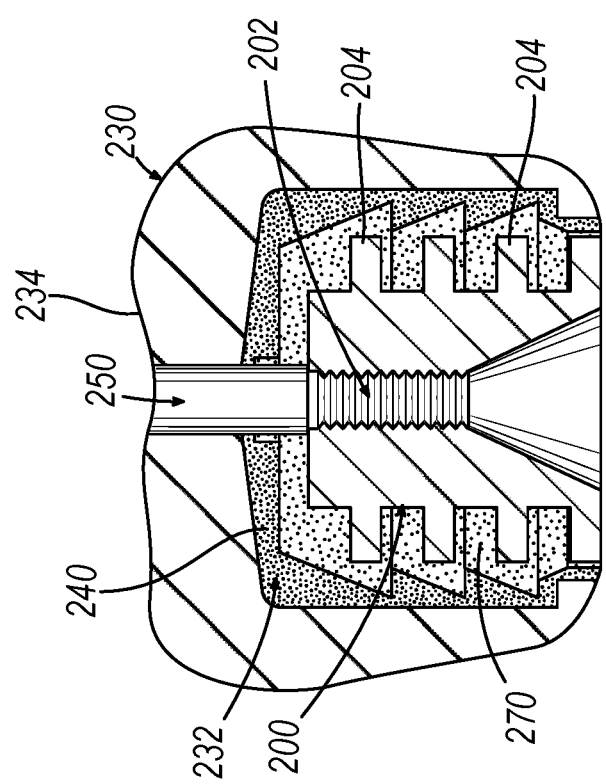
FIG. 6K
FIG. 6J

US 11,666,420 B2

DENTAL ABUTMENT CAP ASSEMBLY

PRIORITY

This application claims priority to U.S. Provisional Patent App. No. 62/783,288, entitled "Dental Abutment Cap Assembly," filed Dec. 21, 2018, the disclosure of which is incorporated by reference herein in its entirety.

BACKGROUND

Some patients may develop tooth loss warranting prosthetic replacement. An example of a dental prosthetic is a crown. To install a crown, a dental surgeon may first perform an osteotomy install an implant into the jaw where tooth is missing. The implant may serve as the structural anchor for the crown. The implant may be fully seated in the jaw, such that no portion of the implant protrudes from the jaw. A healing abutment may be temporarily secured to the implant to allow for osseointegration of the implant and healing of the adjacent gingiva. The surgeon eventually replaces the healing abutment with a final abutment. The final abutment may be secured to the implant via a screw. The crown may then be secured to the final abutment in various ways (e.g., a screw or an adhesive such as acrylic, dental cement, composite, etc.). In some cases, the final abutment may be received in a recess at the underside of the crown; and the crown may be secured directly to the final abutment. In some other cases, a coping or insert may be positioned in a recess at the underside of the crown; and the crown may be secured to the final abutment via the coping or insert.

Examples of dental crowns and associated technologies are described in U.S. Pat. No. 6,915,178, entitled "Dental Prosthesis Manufacturing Process, Dental Prosthesis Pattern & Dental Prosthesis Made Thereby," issued Jul. 5, 2005, the disclosure of which is incorporated by reference herein; U.S. Pat. No. 8,200,462, entitled "Dental Appliances," issued Jun. 12, 2012, the disclosure of which is incorporated by reference herein; U.S. Pat. No. 8,769,822, entitled "Method for Manufacturing a Dental Prosthesis," issued Jul. 8, 2014, the disclosure of which is incorporated by reference herein; and U.S. Pub. No. 2018/0036103, entitled "Multi-Piece Abutment and Digital Method for Preparation of a Dental Implant Surgical Site for the Promotion of a Desired Emergent Sulcus," published Feb. 8, 2018, the disclosure of which is incorporated by reference herein.

While several dental surgical devices and methods have been made and used, it is believed that no one prior to the inventors has made or used the invention described in the appended claims.

BRIEF DESCRIPTION OF THE DRAWINGS

The drawings and detailed description that follow are intended to be merely illustrative and are not intended to limit the scope of the invention as contemplated by the inventors.

FIG. 6J depicts a cross-sectional side view of the crown insert of FIG. 6C secured to the assembly of FIG. 6H, with the resulting assembly removed from the abutment of FIG. 3, during a tenth stage of the dental surgical procedure of FIG. 6A; and FIG. 6K depicts a cross-sectional side view of the assembly of FIG. 6J secured to the abutment of FIG. 6B, during an eleventh stage of the dental surgical procedure of FIG. 6A.

DETAILED DESCRIPTION

Figure 1:
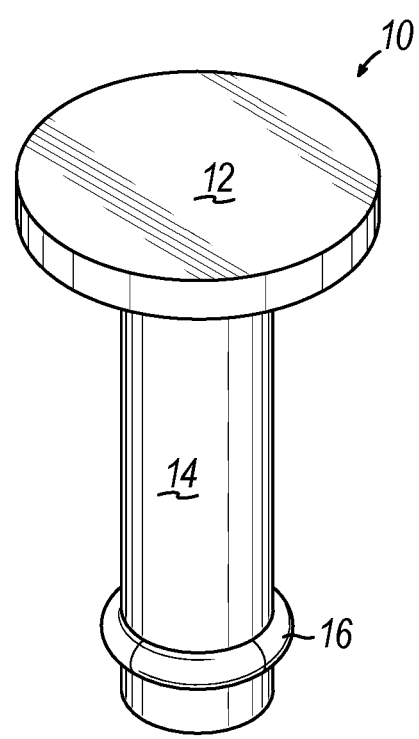
FIG. 1 depicts a perspective view of an exemplary cap that may be inserted into a dental prosthesis.

The following description of certain examples of the invention should not be used to limit the scope of the present invention. The drawings, which are not necessarily to scale, depict selected embodiments and are not intended to limit the scope of the invention. The detailed description illustrates by way of example, not by way of limitation, the principles of the invention. Other examples, features, aspects, embodiments, and advantages of the invention will become apparent to those skilled in the art from the following description, which is by way of illustration, one of the best modes contemplated for carrying out the invention. As will be realized, the invention is capable of other different or equivalent aspects, all without departing from the invention. Accordingly, the drawings and descriptions should be regarded as illustrative in nature and not restrictive.

Any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%. In addition, as used herein, the terms "patient," "host," "user," and "subject" refer to any human or animal subject and are not intended to limit the systems or methods to human use, although use of the subject invention in a human patient represents a preferred embodiment.

I. EXEMPLARY CAP FOR USE IN DENTAL PROSTHETIC PROCEDURE

As noted above, in some processes for installing a dental prosthetic such as a crown is installed along an alveolar ridge of a patient, a coping or insert may be positioned in a recess on the underside of the prosthetic. The coping or insert may serve as a structural interface between the prosthetic and an abutment, which is secured to the bone of the alveolar ridge. The term "insert" will be used hereinafter, it being understood that "insert" is intended to mean the same thing as the term "coping." To ensure an appropriate fit between the insert, the prosthetic, and the abutment, it may be desirable to first seat the insert on the abutment, apply an adhesive (e.g., acrylic, dental cement, composite, etc.) to the recess on the underside of the prosthetic, then press the prosthetic onto the insert. The adhesive may secure the insert to the prosthetic, such that the prosthetic can "pick up" the insert from the abutment in what may be referred to as a "pickup process." The combination of the prosthetic and insert may be subsequently secured to the abutment via a screw, adhesive, or in some other fashion.

During the process of bonding the insert to the prosthetic with the adhesive, it may be desirable to provide one or more structures that prevent the adhesive from reaching areas where it would be undesirable for the adhesive to reach. For instance, it may be desirable to physically block the adhesive from reaching a screw head or opening that is intended to receive a screw.

In some cases, it may be desirable to pass a screw through an occlusal surface (or other surface) of the prosthetic in order to secure the combination of the prosthetic and insert to an abutment. The prosthetic may thus include a screw access passageway formed through the occlusal surface (or other surface) of the prosthetic. In some such cases, the position and orientation of the screw access passageway may be predetermined, such that the screw access passageway may be formed before the pickup process described above. Such a preformed screw access passageway may be temporarily blocked during the pickup process to prevent adhesive from entering the screw access passageway. In some other cases, the position and orientation of the screw access passageway is not predetermined, such that the screw access passageway would be formed after the pickup process described above. In such cases, it may be difficult to precisely orient the screw access passageway to allow a screw to properly pass through the screw access passageway, through the insert, and into the abutment.

In view of the foregoing, it may be desirable to provide a device that facilitates formation of a screw access passageway through a dental prosthetic after a pickup process has been completed. It may be further desirable for such a device to prevent adhesive from reaching undesirable areas during the pickup process. Examples of such devices are described in greater detail below.

A. Exemplary Cap with Guide Shaft

FIG. 1 depicts an exemplary cap (10) that may be used during a procedure in which a dental prosthetic such as a crown is installed along an alveolar ridge of a patient. Cap (10) of this example comprises a circular head (12) and a hollow shaft (14) extending perpendicularly from the underside of head (12). An annular bump (16) is positioned near the free end of shaft (14). Bump (16) is configured to provide an interference fit or detent fit with another component as will be described in greater detail below. It should be understood that various other kinds of structural features may be provided in addition to, or in lieu of, bump (16) in order to enhance friction between shaft (14) and a complementary component as will be described in greater detail below. Various suitable alternatives to bump (16) will be apparent to those skilled in the art in view of the teachings herein. In some variations, bump (16) is simply omitted. By way of example only, cap (10) may be formed of a plastic material, including but not limited to nylon. Other suitable materials that may be used to form cap (10) will be apparent to those skilled in the art in view of the teachings herein.

Figure 2C:
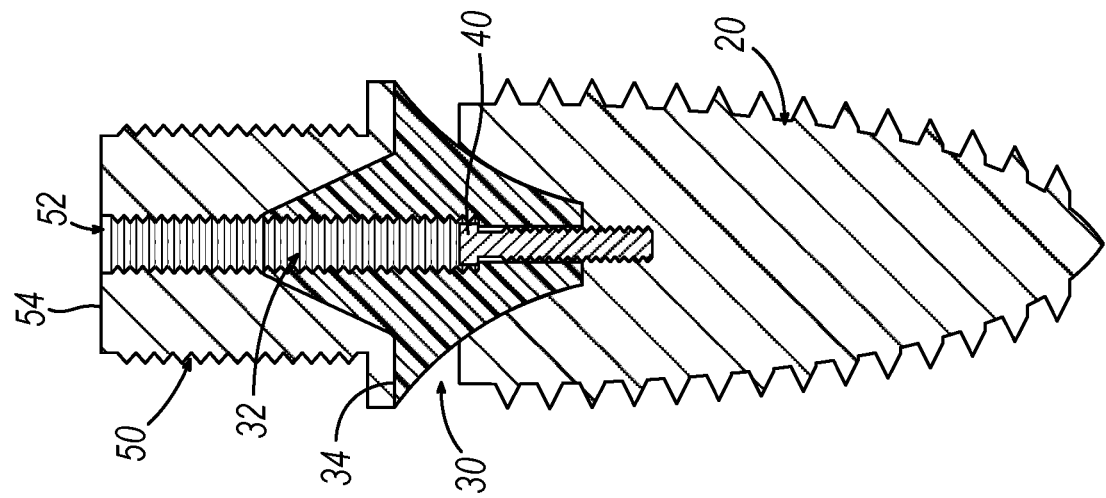
FIG. 2C depicts a cross-sectional side view of a crown insert positioned on the abutment of FIG. 2B, during a third stage of the dental surgical procedure of FIG. 2A.
Figure 2B:
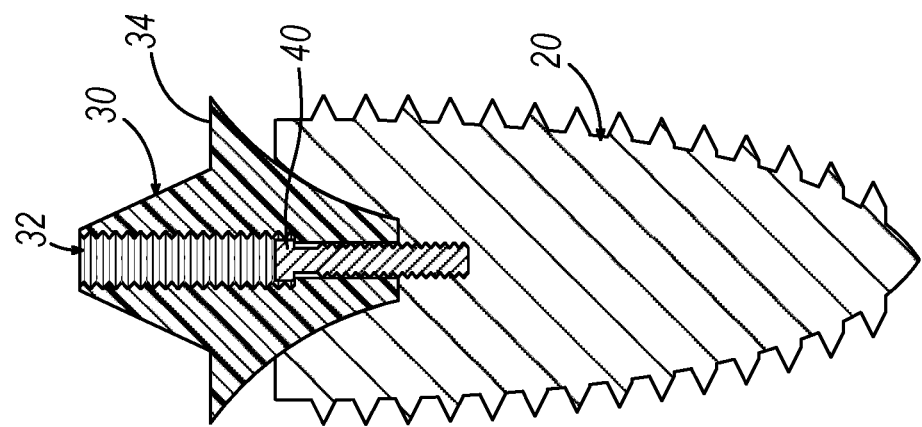
FIG. 2B depicts a cross-sectional side view of an exemplary abutment secured to the dental implant of FIG. 2A, during a second stage of the dental surgical procedure of FIG. 2A.
Figure 2A:
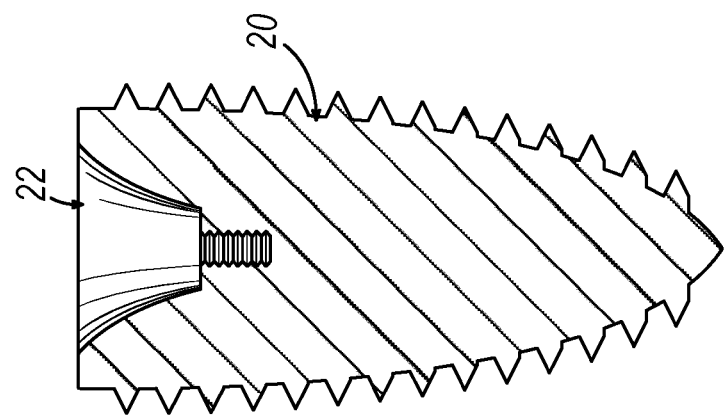
FIG. 2A depicts a cross-sectional side view of an exemplary dental implant, during a first stage of an exemplary dental surgical procedure.

FIGS. 2A-2I depict various stages of a surgical procedure in which cap (10) is used. At the beginning of the process as shown in FIG. 2A, an implant (20) is installed in the bone (not shown) of an alveolar arch (not shown) of a patient. By way of example only, the alveolar arch may be on the maxillary jaw or mandibular jaw of the patient. Implant (20) may be in the form of any conventional implant (20), with a threaded exterior and a recess (22) defining internal threading. By way of example only, implant (20) may be formed of titanium, stainless steel, and/or any other suitable material(s) as will be apparent to those skilled in the art in view of the teachings herein.

FIG. 2B shows a final abutment (30) secured to implant (20). It should be understood that, between the stage shown in FIG. 2A and the stage shown in FIG. 2B, a healing abutment (not shown) may be temporarily secured to implant (20) to provide for osseointegration of implant (20) and healing of the adjacent gingiva, as is known in the art. Final abutment (30) of the present example includes a threaded bore (32) and an upper shoulder surface (34). A screw (40) is positioned in bore (32) and thereby secures abutment (30) to implant (20), using any suitable techniques known in the art. By way of example only, abutment (30) may comprise a conventional multi-unit abutment or any other suitable kind of abutment as will be apparent to those skilled in the art in view of the teachings herein. By way of further example only, abutment (30) may be formed of titanium, stainless steel, and/or any other suitable material(s) as will be apparent to those skilled in the art in view of the teachings herein.

As shown in FIG. 2C, an insert (50) is then positioned over abutment (30). Insert (50) of this example is cylindraceously shaped, with a ridged exterior. Insert (50) defines a threaded bore (52) and an upper surface (54). The underside of insert (50) rests on upper shoulder surface (34) of abutment (30). In this example, threaded bore (52) of insert (50) is coaxially aligned with threaded bore (32) of abutment (30). By way of example only, insert (50) may be formed of titanium, stainless steel, and/or any other suitable material(s) as will be apparent to those skilled in the art in view of the teachings herein.

Figure 2E:
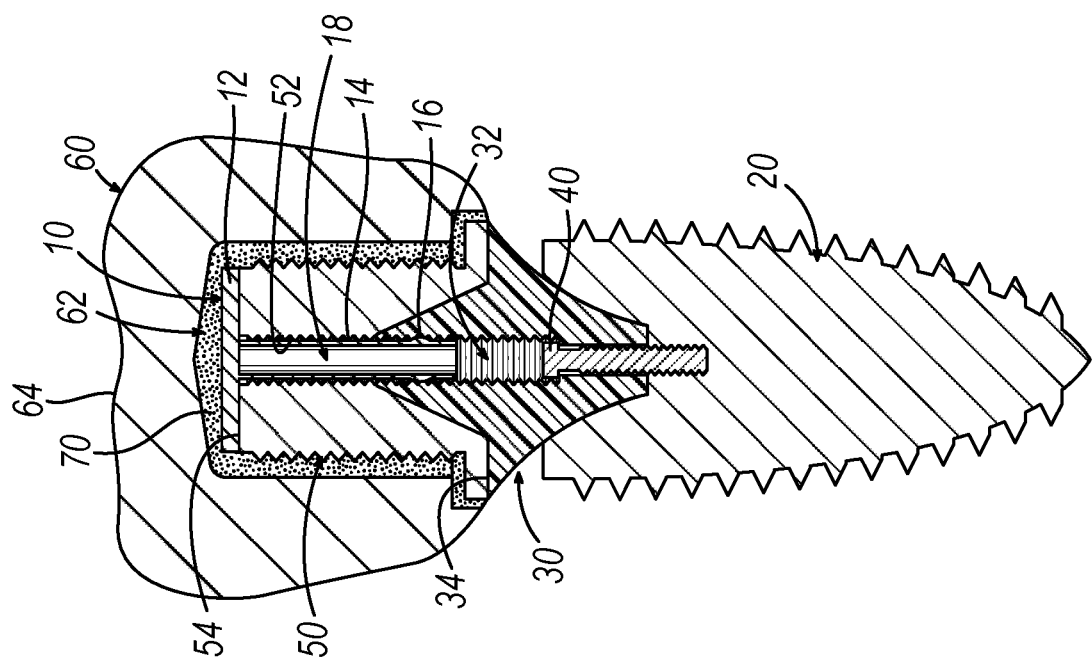
FIG. 2E depicts a cross-sectional side view of a crown and adhesive disposed over the cap of FIG. 1 and the crown insert of FIG. 2C, during a fifth stage of the dental surgical procedure of FIG. 2A.
Figure 2D:
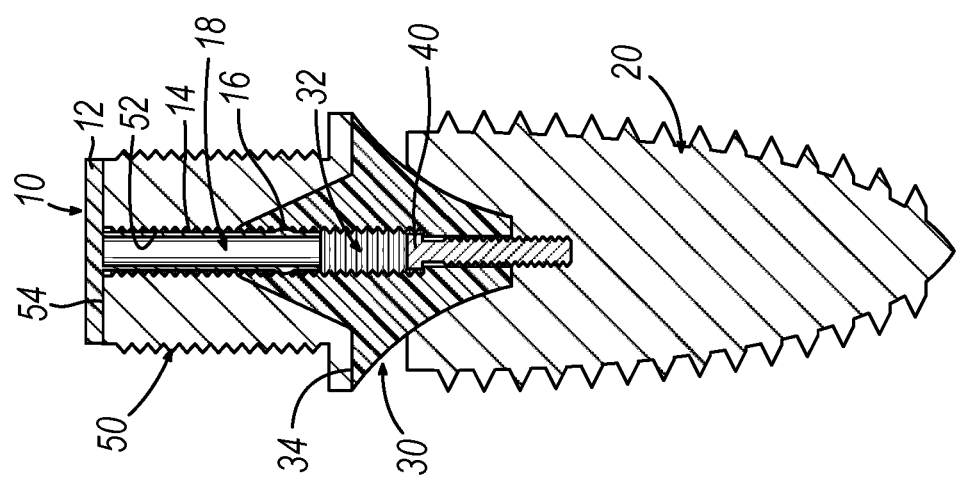
FIG. 2D depicts a cross-sectional side view of the cap of FIG. 1 inserted in the crown insert of FIG. 2C, during a fourth stage of the dental surgical procedure of FIG. 2A.

Next, as shown in FIG. 2D, cap (10) is secured to the assembly over implant (20). In particular, shaft (14) is inserted through bores (52, 32), with head (12) resting on upper surface (54) of insert (50). The terminal end of shaft (14) is positioned above screw (40). Annular bump (16) of shaft (14) bears against the inner diameter of bore (32), providing an interference fit between shaft (14) and bore (32). Cap (10) is thus substantially retained relative to abutment (30). Moreover, with insert (50) being captured between head (12) and upper shoulder surface (34), cap (10) substantially retains insert (50) on abutment (30). In some variations, bore (32) includes an annular recess that complements annular bump (16), thereby providing a detent fit between shaft (14) and bore (32). In some other variations, the outer diameter of shaft (14) includes threading that provides a threaded coupling with complementary threading in bore (32). Other suitable features that may be used to provide a releasable coupling between cap (10) and abutment (30) will be apparent to those skilled in the art in view of the teachings herein.

With insert (50) being releasably yet firmly retained against abutment (30), a prosthetic (60) is then pressed onto cap (10) and insert (50) as shown in FIG. 2E. Prosthetic (60) of this example is in the form of a single-tooth crown. However, it should be understood that the teachings herein may also be applied to various other kinds of prosthetics, including but not limited to bridges, dentures and other full arch restorations, etc. The underside of prosthetic (60) defines a recess (62). An adhesive (70) is positioned in recess (62). As shown, adhesive (70) fills the space between the ridged exterior of insert (50) and the inner surface of recess (62), thereby securing prosthetic (60) to insert (50). As also shown, cap (10) prevents adhesive (70) from entering bore (52) of insert (50).

After reaching the state shown in FIG. 2E, the configuration is maintained until adhesive (70) sufficiently cures. After adhesive (70) has sufficiently cured, prosthetic (60) is pulled away from abutment (30). As shown in FIG. 2F, prosthetic (60) will pick up insert (50) and cap (10) when prosthetic (60) is pulled away from abutment (30), due to the presence of cured adhesive in the space between the ridged exterior of insert (50) and the inner surface of recess (62).

Figure 2G:
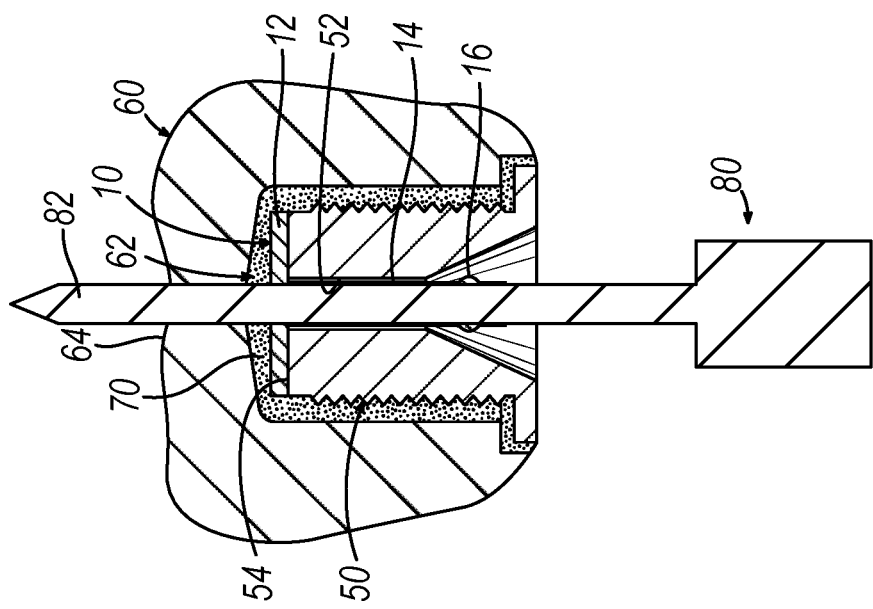
FIG. 2G depicts a cross-sectional side view of the assembly of FIG. 2F, with a drilling instrument passing through the crown via a shaft of the cap, during a seventh stage of the dental surgical procedure of FIG. 2A.
Figure 2F:
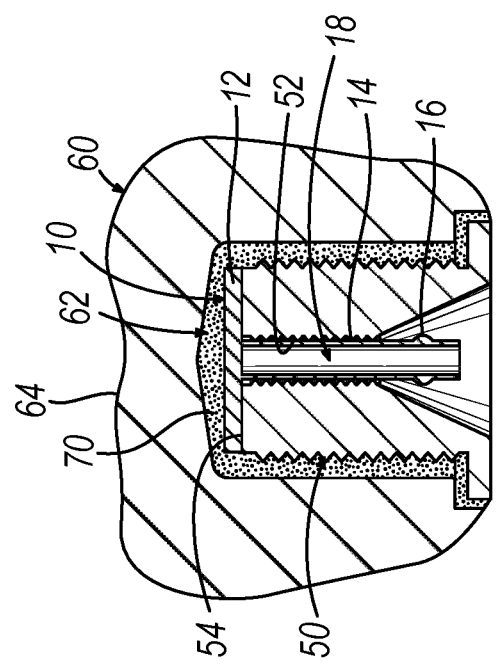
FIG. 2F depicts a cross-sectional side view of the cap of FIG. 1 and the crown insert of FIG. 2C secured to the crown of FIG. 2E via the adhesive, with the resulting assembly removed from the abutment of FIG. 2B, during a sixth stage of the dental surgical procedure of FIG. 2A.

Next, the bit (82) of a drilling instrument (80) is passed through the hollow interior of shaft (14) of cap (10), drilling through head (12), adhesive (70), and prosthetic (60), as shown in FIG. 2G. Bit (82) ultimately exits through occlusal surface (64) of prosthetic (60). Drilling instrument (80) may comprise any suitable conventional dental drilling instrument; and bit (82) may comprise any suitable conventional dental drill bit. It should be understood that shaft (14) acts as a guide for bit (82) during the drilling process. Since insert (50) and cap (10) were secured to prosthetic (60) via adhesive (70) when shaft (14) was coaxially aligned with bores (52, 32), guidance from shaft (14) will ensure that bit (82) travels along a path that is along the same axis associated with bores (52, 32) when the assembly is repositioned on abutment (30) as will be described in greater detail below. Thus, while cap (10) served as a blocking structure against adhesive (70) during the stage shown in FIG. 2E, cap (10) serves as a guide for bit (82) during the stage shown in FIG. 2G.

After bit (82) is removed from prosthetic (60), it may be desirable to widen the passageway formed by bit (82). The resulting configuration is shown in FIG. 2H. As shown, widened passageway (90) has a diameter that is greater than the diameter of the bore (18) of shaft (14). Various suitable instruments and techniques that may be used to widen passageway (90) will be apparent to those skilled in the art in view of the teachings herein. It should also be understood that widened passageway (90) may be coaxially centered on the same axis as the original passageway formed by bit (82). As is also shown in FIG. 2H, the free end of shaft (14) protruding out through the bottom of bore (52) of insert (50) may be cut away, such that no portion of shaft (14) protrudes out through the bottom of bore (52) at this stage. Various suitable instruments and techniques that may be used cut away the free end of shaft (14) will be apparent to those skilled in the art in view of the teachings herein. While passageway (90) is formed through occlusal surface (64) in the present example, in some other versions, passageway (90) may be formed through a different surface of prosthetic (60).

Figure 2I:
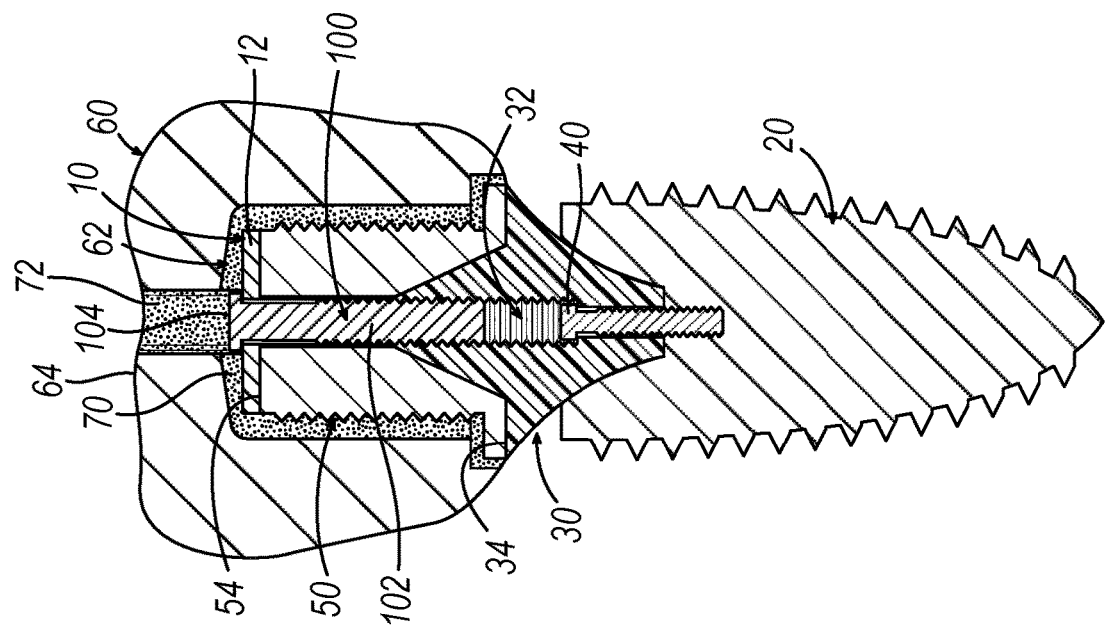
FIG. 2I depicts a cross-sectional side view of the assembly of FIG. 2H secured to the abutment FIG. 2B, during a ninth stage of the dental surgical procedure of FIG. 2A.
Figure 2H:
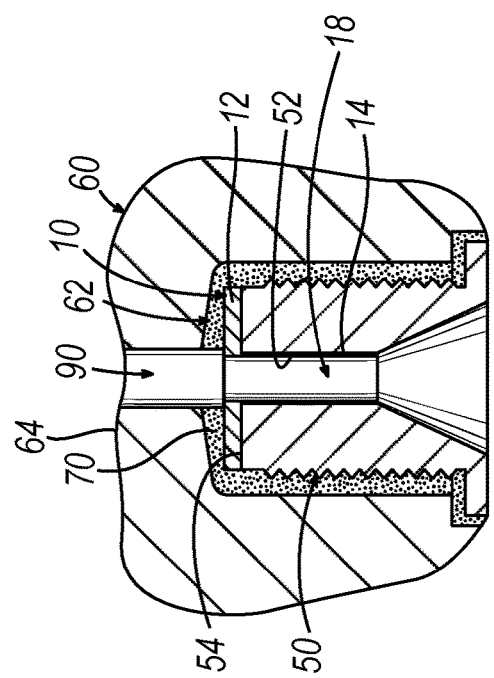
FIG. 2H depicts a cross-sectional side view of the assembly of FIG. 2F, after removal of the drilling instrument, and after an upper portion of the resulting passageway is enlarged, during an eighth stage of the dental surgical procedure of FIG. 2A.

Next, the assembly shown in FIG. 2H may be repositioned onto abutment (30) as shown in FIG. 2I. As is also shown in FIG. 2I, a screw (100) may be passed through passageway (90) to secure the assembly of FIG. 2H onto abutment (30). The shaft (102) of screw (100) is long enough to reach bore (32) of abutment (30) and threadably engage the internal threading of bore (32). The head (104) of screw (100) is small enough to pass through passageway (90) yet seat on top of head (12). With screw (100) installed to secure prosthetic (60) and insert (50) to abutment (30), adhesive (72) may be added to fill in passageway (90). The cured adhesive (72) may also be shaped using conventional instrumentation and techniques, in order to provide an uninterrupted occlusal surface (64) on prosthetic (60). At this stage, the process may be deemed complete, such that the patient may thereafter utilize the installed prosthetic (60) like a natural tooth.

B. Exemplary Cap with Guide Recess

Figure 3:
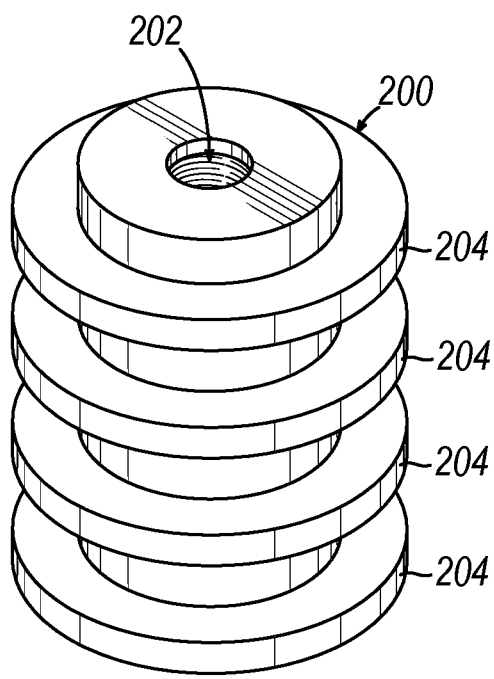
FIG. 3 depicts a perspective view of an exemplary insert that may be used to secure a dental prosthesis to an abutment.

FIG. 3 depicts an exemplary insert (200) that may be used during a procedure in which a dental prosthetic such as a crown is installed along an alveolar ridge of a patient. Insert (200) of this example. Is generally cylindraceous, defines an internal bore (202), and has a plurality of annular flanges (204). While four annular flanges (204) are shown, insert (200) may have any other suitable number of flanges (204). By way of example only, insert (200) may be formed of titanium, stainless steel, and/or any other suitable material(s) as will be apparent to those skilled in the art in view of the teachings herein.

Figure 4:
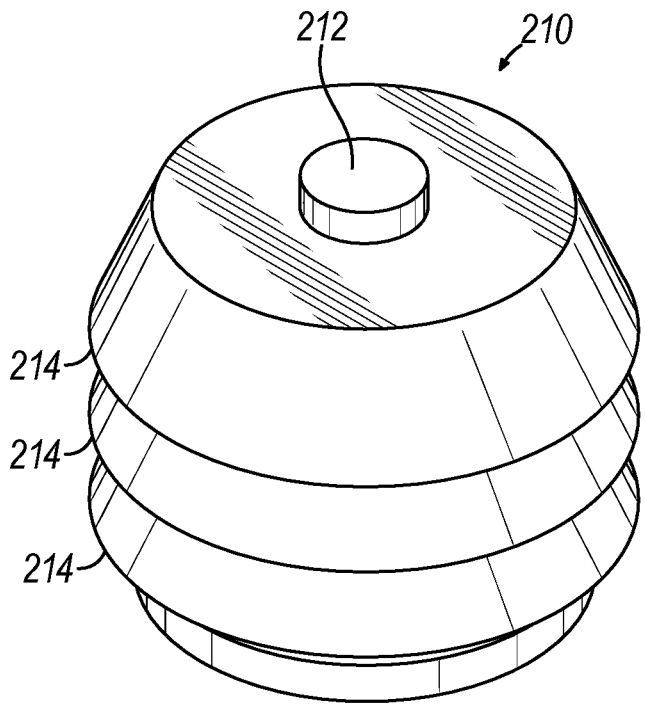
FIG. 4 depicts a perspective view of an exemplary cap that may be secured to the insert of FIG. 3.
Figure 5:
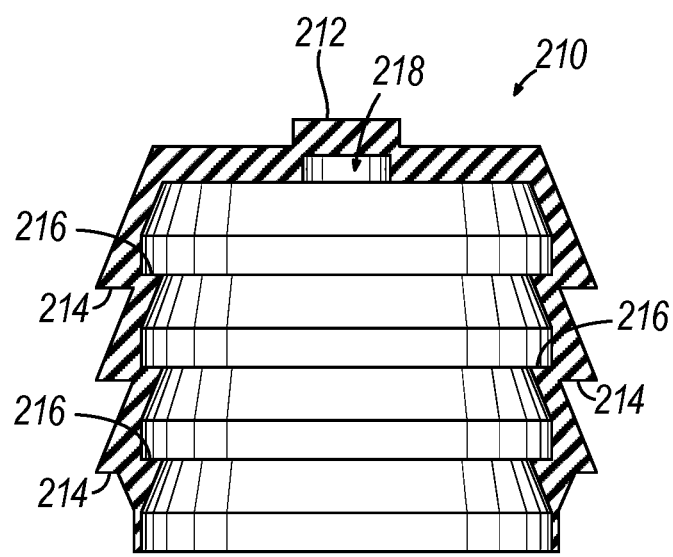
FIG. 5 depicts a cross-sectional side view of the cap of FIG. 4.

FIGS. 4-5 depict an exemplary cap (210) that may be secured to insert (200) during a procedure in which a dental prosthetic such as a crown is installed along an alveolar ridge of a patient. Cap (210) of this example includes a nose portion (212) and a plurality of downwardly-facing outer shelves (214), thereby providing the exterior of cap (210) with a barbed configuration. As shown in FIG. 5, the interior of cap (210) includes a plurality of upwardly-facing inner shelves (216), such that the interior of cap (210) has a ribbed configuration. The interior of cap (210) also includes a guide recess (218) formed in nose portion (212). Cap (210) of the present example is formed of a plastic material. By way of example only, cap (210) may be formed of nylon, polyether ether ketone (PEEK), and/or any other suitable material(s) as will be apparent to those skilled in the art in view of the teachings herein. In some instances, a surgeon may be provided with a selection of different caps (210) formed of different materials having different properties (e.g., semi-rigid vs. flexible), such that the surgeon may select the kind of cap (210) that is most appropriate for the patient at hand.

Figure 6C:
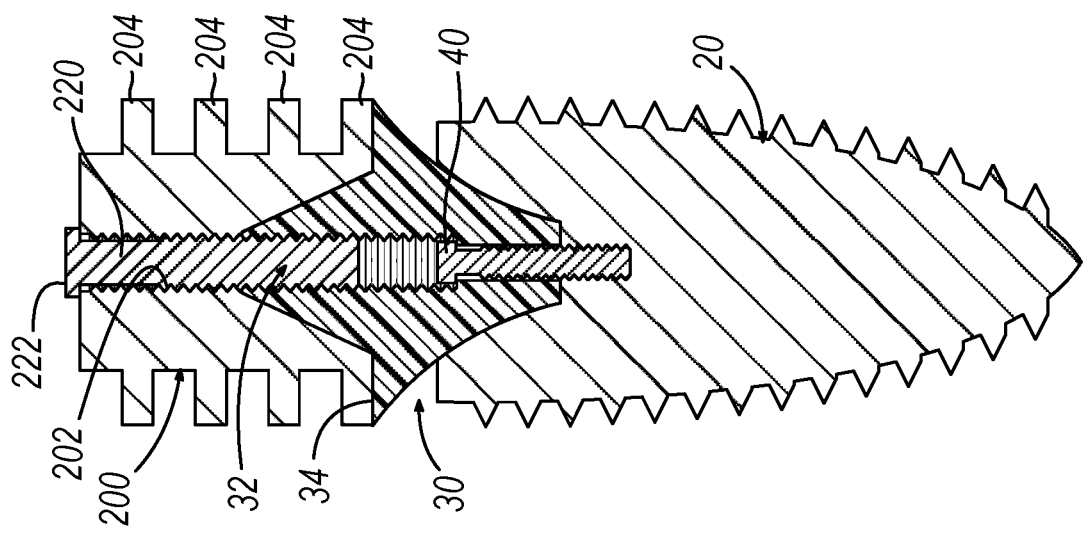
FIG. 6C depicts a cross-sectional side view of a crown insert positioned on the abutment of FIG. 3, during a third stage of the dental surgical procedure of FIG. 6A.
Figure 6B:
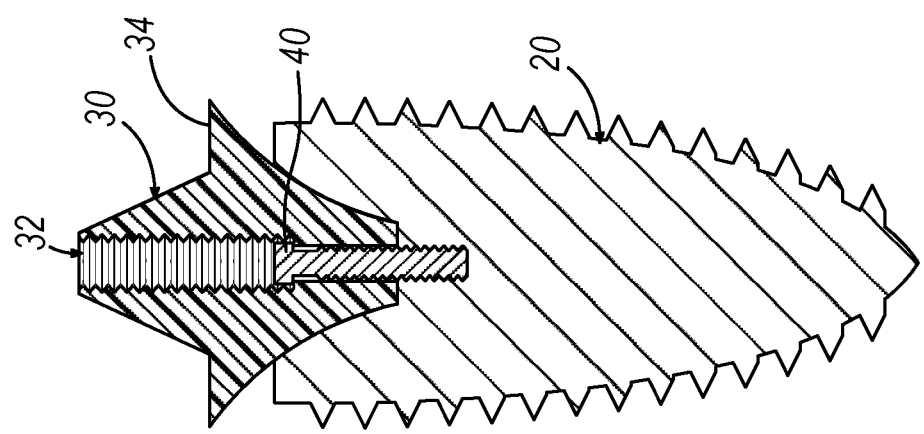
FIG. 6B depicts a cross-sectional side view of the abutment of FIG. 3 secured to the dental implant of FIG. 6A, during a second stage of the dental surgical procedure of FIG. 6A.
Figure 6A:
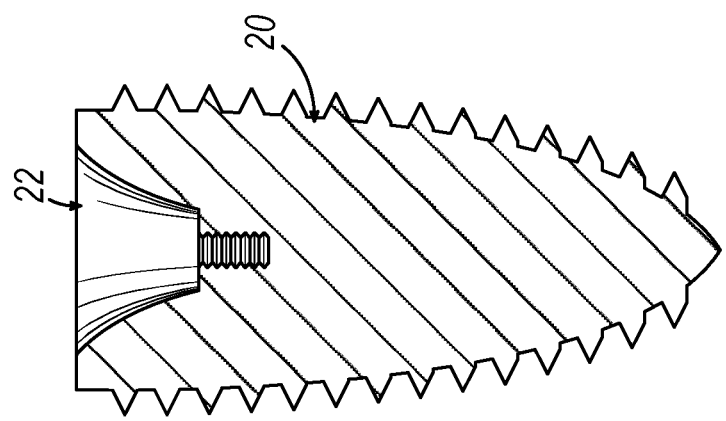
FIG. 6A depicts a cross-sectional side view of an exemplary dental implant, during a first stage of an exemplary dental surgical procedure.

FIGS. 6A-6K depict various stages of a surgical procedure in which insert (200) and cap (210) are used. At the beginning of the process as shown in FIG. 6A, an implant (20) is installed in the bone (not shown) of an alveolar arch (not shown) of a patient. By way of example only, the alveolar arch may be on the maxillary jaw or mandibular jaw of the patient. Implant (20) may be in the form of any conventional implant (20), with a threaded exterior and a recess (22) defining internal threading. By way of example only, implant (20) may be formed of titanium, stainless steel, and/or any other suitable material(s) as will be apparent to those skilled in the art in view of the teachings herein.

FIG. 6B shows a final abutment (30) secured to implant (20). It should be understood that, between the stage shown in FIG. 6A and the stage shown in FIG. 6B, a healing abutment (not shown) may be temporarily secured to implant (20) to provide for osseointegration of implant (20) and healing of the adjacent gingiva, as is known in the art. Final abutment (30) of the present example includes a threaded bore (32) and an upper shoulder surface (34). A screw (40) is positioned in bore (32) and thereby secures abutment (30) to implant (20), using any suitable techniques known in the art. By way of example only, abutment (30) may comprise a conventional multi-unit abutment or any other suitable kind of abutment as will be apparent to those skilled in the art in view of the teachings herein. By way of further example only, abutment (30) may be formed of titanium, stainless steel, and/or any other suitable material(s) as will be apparent to those skilled in the art in view of the teachings herein.

As shown in FIG. 6C, insert (200) is then positioned over abutment (30). The underside of insert (200) rests on upper shoulder surface (34) of abutment (30). In this example, threaded bore (202) of insert (200) is coaxially aligned with threaded bore (32) of abutment (30). A screw (220) is passed through bore (202) of insert (200) and into bore (32) of abutment (30). A head (222) of screw (220) is positioned atop insert (200) and has a diameter larger than the diameter of bore (202), such that screw (220) securably retains insert (200) on abutment (30).

Figure 6E:
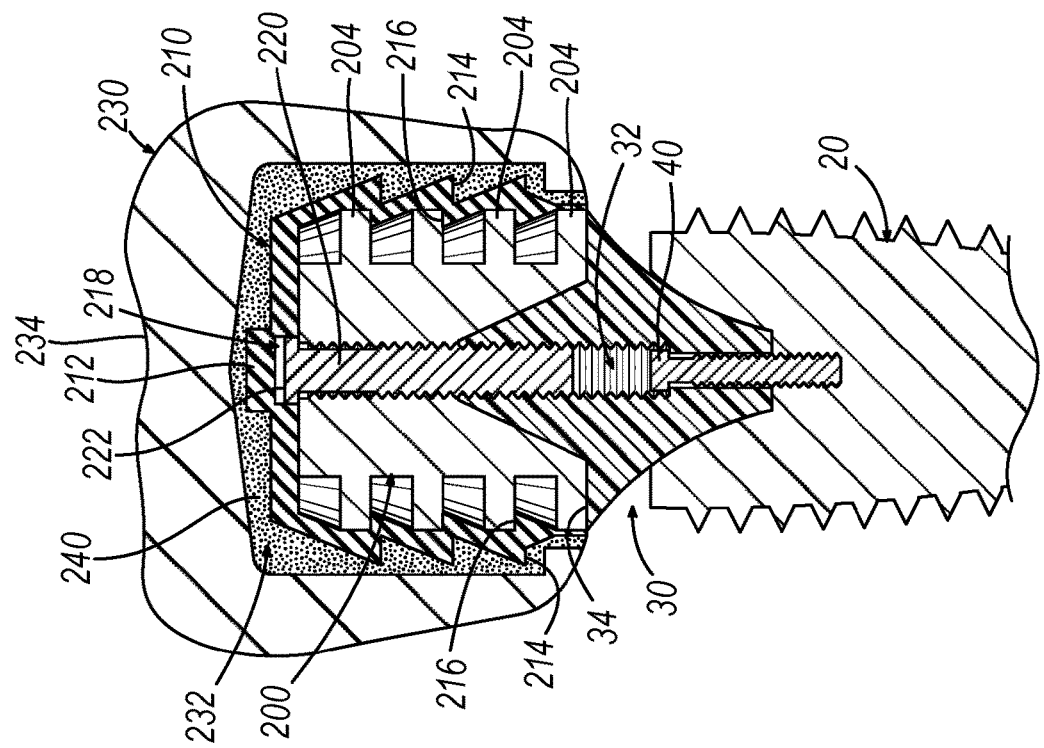
FIG. 6E depicts a cross-sectional side view of a crown and adhesive disposed over the cap of FIG. 4 and the crown insert of FIG. 6C, during a fifth stage of the dental surgical procedure of FIG. 6A.
Figure 6D:
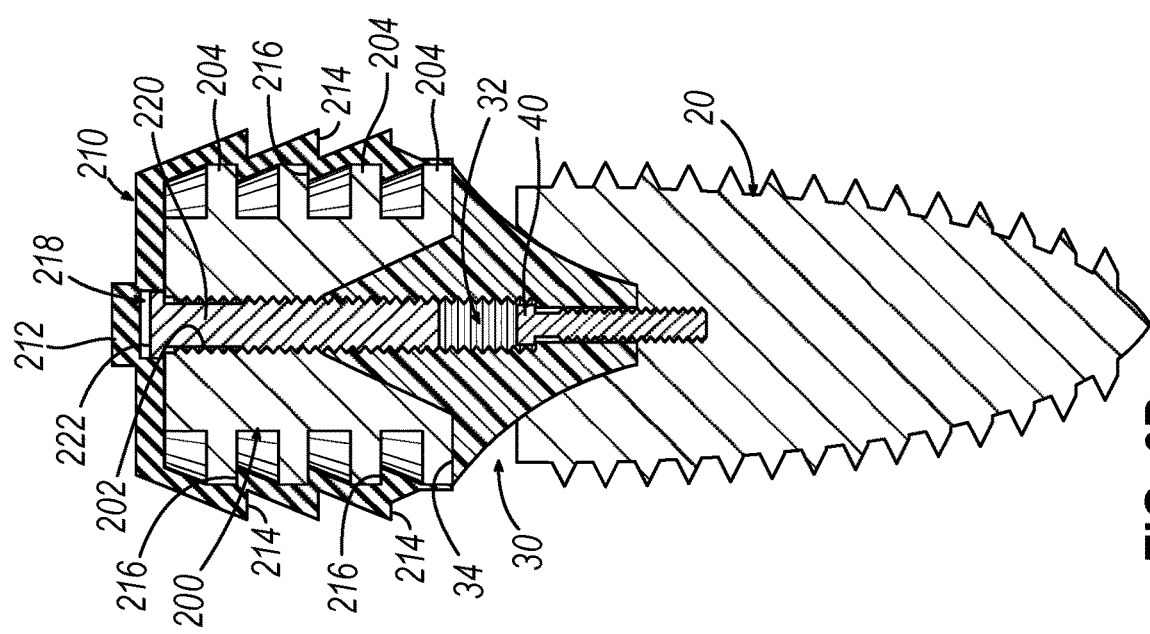
FIG. 6D depicts a cross-sectional side view of the cap of FIG. 4 secured to the crown insert, during a fourth stage of the dental surgical procedure of FIG. 6A.

With insert (200) secured to abutment (30) via screw (220), cap (210) is then pressed onto insert (200), as shown in FIG. 6D. As cap (210) is pressed onto insert (200), the ribbed configuration of the interior of cap (210) ratchets along flanges (204) of insert (200). When cap (210) is fully seated on insert (200), upwardly-facing surfaces of inner shelves (216) abut downwardly-facing surfaces of corresponding flanges (204) of insert, such that shelves (216) cooperate with flanges (204) to secure cap (210) to insert (200). As shown, the interior of cap includes angled lead-in surfaces that facilitate the ratcheting action adjacent to shelves (216) as cap (210) is pressed onto insert (200). As also shown in FIG. 6D, guide recess (218) in nose portion (212) of cap (210) accommodates head (222) of screw (220) when cap (210) is fully seated on insert (200). Guide recess (218) is coaxially aligned with screw (220) and bores (202, 32).

With cap (210) being retained against insert (200), a prosthetic (230) is then pressed onto cap (210) and insert (200) as shown in FIG. 6E. Prosthetic (230) of this example is in the form of a single-tooth crown. However, it should be understood that the teachings herein may also be applied to various other kinds of prosthetics, including but not limited to bridges, dentures, etc. The underside of prosthetic (230) defines a recess (232). An adhesive (240) is positioned in recess (232). As shown, adhesive (240) fills the space between the exterior of cap (210) and the inner surface of recess (232), thereby securing prosthetic (230) to cap (210). As also shown, cap (210) prevents adhesive (240) from reaching head (222) of screw (220). Adhesive (240) is allowed to cure. In some instances, the configuration shown in FIG. 6E is maintained for approximately three to seven days. In some other instances, the configuration shown in FIG. 6E is maintained for approximately three to four months, which may provide sufficient time for osseointegration of implants (20). Alternatively, the configuration shown in FIG. 6E may be maintained for any other suitable duration.

Once adhesive (240) is cured after achieving the state shown in FIG. 6E, outer shelves (214) will help secure adhesive (240) to cap (210). As noted above, shelves (216) cooperate with flanges (204) to secure cap (210) to insert (200). As also noted above, screw (220) secures insert (200) to abutment (30); and screw (40) secures abutment (30) to implant (20). In some cases, particularly those where cap (210) is formed of a substantially rigid material (e.g., polyether ether ketone (PEEK), etc.), the process may be considered complete at this stage. The above-noted components may sufficiently secure prosthetic (230) relative to the bone of the patient's jaw such that the patient may utilize prosthetic (230) like a natural tooth. Cap (210) may provide some degree of shock absorption between prosthetic (230) and insert (200) as the patient uses prosthetic (230) to masticate, etc. Cap (210) may thus simulate the occlusal force shock absorption that would otherwise be provided by sub-periodontal ligaments.

In some instances, it may still be desirable to form a screw access opening through prosthetic (230). To that end, as a next stage, the surgeon may pull the combination of prosthetic (230) and cap (210) off of insert (200), resulting in the configuration shown in FIG. 6F. During this pulling off of prosthetic (230) and cap (210), inner shelves (216) may deform to allow clearance of flanges (204), particularly in versions where cap (210) is formed of a flexible material (e.g., nylon, etc.).

Figure 6G:
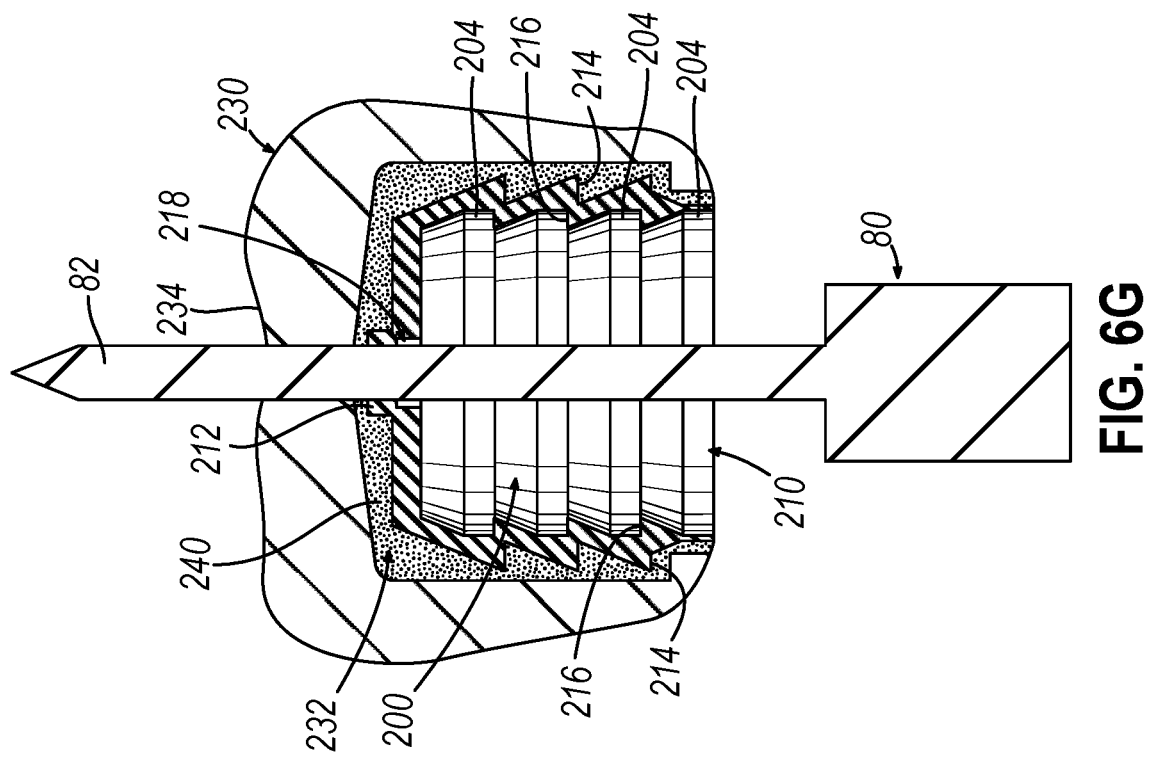
FIG. 6G depicts a cross-sectional side view of the assembly of FIG. 6F, with a drilling instrument passing through the crown via a guide recess of the cap, during a seventh stage of the dental surgical procedure of FIG. 6A.
Figure 6F:
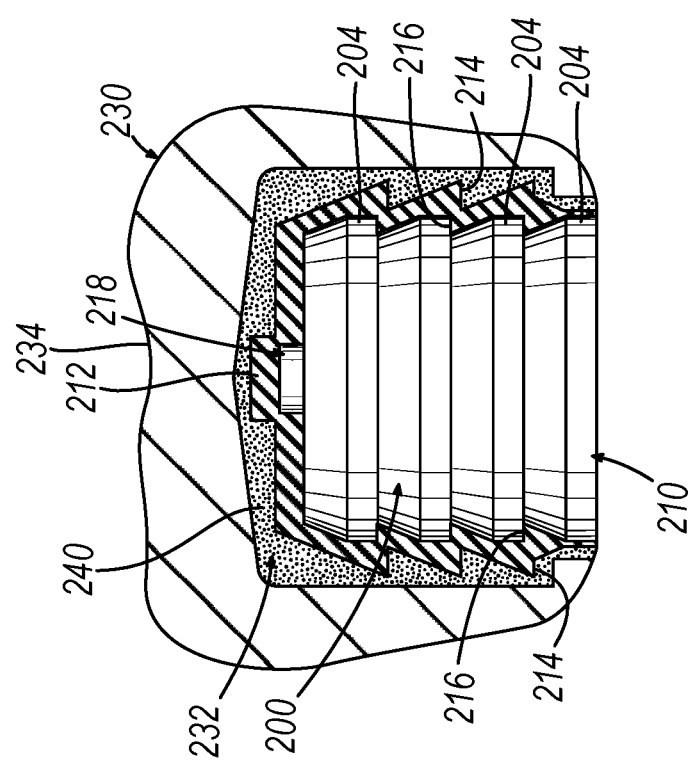
FIG. 6F depicts a cross-sectional side view of the cap of FIG. 4 secured to the crown of FIG. 6E via the adhesive, with the resulting assembly removed from the crown insert of FIG. 6C, during a sixth stage of the dental surgical procedure of FIG. 6A.

Next, as shown in FIG. 6G, the bit (82) of a drilling instrument (80) is passed through guide recess (218), drilling through nose portion (212), adhesive (240), and prosthetic (230). Bit (82) ultimately exits through occlusal surface (234) of prosthetic (230). Drilling instrument (80) may comprise any suitable conventional dental drilling instrument; and bit (82) may comprise any suitable conventional dental drill bit. It should be understood that guide recess (218) acts as a guide for bit (82) during the drilling process. Since cap (210) was secured to prosthetic (230) via adhesive (240) when guide recess (218) was coaxially aligned with bores (202, 32), guidance from guide recess (218) will ensure that bit (82) travels along a path that is along the same axis associated with bores (202, 32) when the assembly is repositioned on the combination of abutment (30) and insert (200) as will be described in greater detail below. Thus, while cap (210) served as a blocking structure against adhesive (240) during the stage shown in FIG. 6E, cap (210) serves as a guide for bit (82) during the stage shown in FIG. 6G.

Figure 6I:
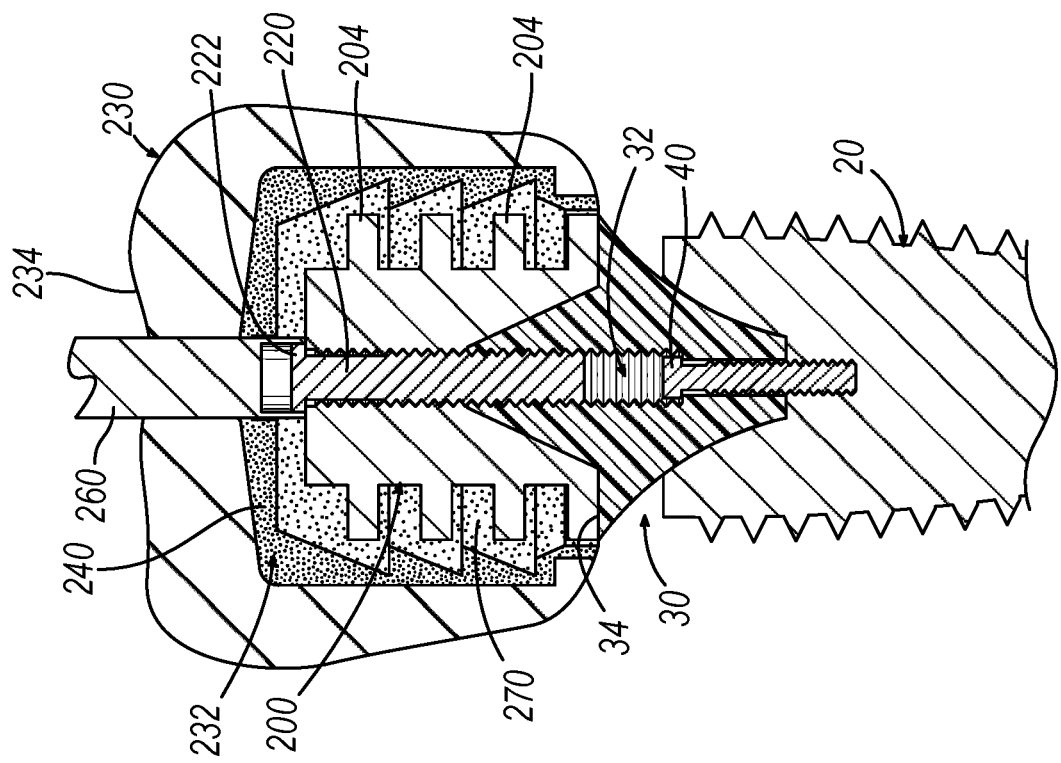
FIG. 6I depicts a cross-sectional side view of the assembly of FIG. 6H positioned over the crown insert of FIG. 6C with another layer of adhesive, and with a shaft disposed in the passageway formed by the drilling instrument of FIG. 6I, during a ninth stage of the dental surgical procedure of FIG. 6A.
Figure 6H:
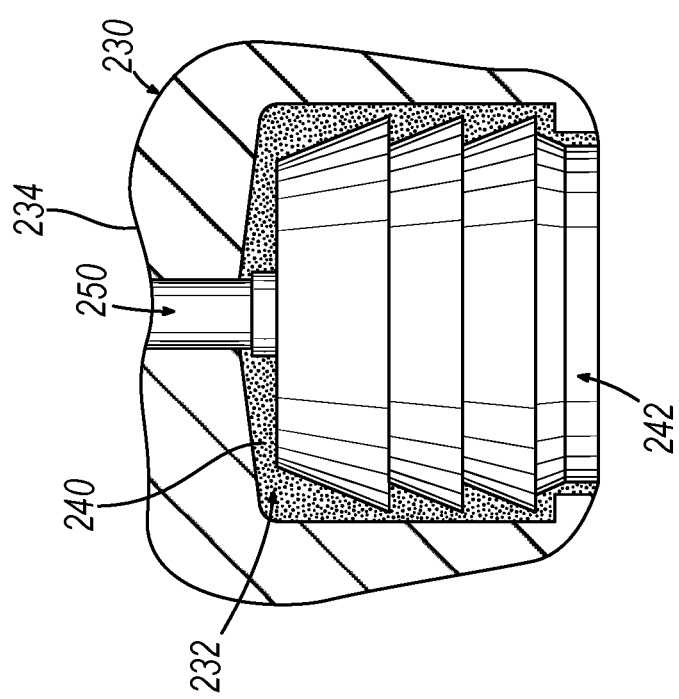
FIG. 6H depicts a cross-sectional side view of the assembly of FIG. 6F, after removal of the drilling instrument, and after removal of the cap of FIG. 4, during an eighth stage of the dental surgical procedure of FIG. 6A.

After bit (82) is removed from prosthetic (230) as shown in FIG. 6H, a resulting passageway (250) is formed through prosthetic (230) and adhesive (240). Passageway (250) is oriented such that passageway (250) will be coaxial with bores (202, 32) when the assembly is repositioned on the combination of abutment (30) and insert (200) as will be described in greater detail below. While passageway (250) is formed through occlusal surface (234) in the present example, in some other versions, passageway (250) may be formed through a different surface of prosthetic (230). As also shown in FIG. 6H, cap (210) has been removed from adhesive (240). For instance, the surgeon may simply grasp cap (210) with a forceps instrument and peel cap (210) out of adhesive (240), may use a scraping instrument to scrape cap (210) out of adhesive (240), and/or may use any other suitable instrumentation or techniques to remove cap (210) from adhesive (240). Adhesive (240) defines a hollow interior (242) with a configuration mirroring the outer configuration of cap (210), due to the impression made by the exterior of cap (210). It should be understood that adhesive (240) is hardened at this stage.

Next, another layer of fresh adhesive (270) is provided in the hollow interior (242) defined by adhesive (240); and the resulting assembly is repositioned onto insert (200) as shown in FIG. 6I. In some instances, adhesive (270) is instead applied to the exterior of insert (200) rather than being applied to hollow interior (242) defined by adhesive (240). In either case, insert (200) remains secured to abutment (30) via screw (220) during this process. A shaft (260) is positioned in passageway (250) and engages head (222) of screw (220) during this process, to prevent adhesive (270) from reaching head (222). Shaft (260) may be coated with a petroleum jelly or some other substance to prevent adhesive from adhering to shaft (260). Similarly, petroleum jelly or some other substance may be applied to head (222) of screw (220) to prevent adhesive (270) from adhering to head (222). In some instances, shaft (260) is an allen wrench or hex key. In some other instances, this step of shaft (260) being positioned in passageway (250) is omitted. In some such instances, adhesive (270) is also used to fill passageway (250). The cured adhesive (270) may also be shaped using conventional instrumentation and techniques, in order to provide an uninterrupted occlusal surface (234) on prosthetic (230). At this stage, the process may be deemed complete, such that the patient may thereafter utilize the installed prosthetic (230) like a natural tooth. In cases where shaft (260) is used, shaft (260) may be removed at any appropriate time, and the procedure may continue as described below.

After adhesive (270) cures, insert (200) may be bonded to prosthetic (230) via the combined layers of adhesive (240, 270). Screw (220) may be removed to allow the combination of prosthetic (230), insert (200), and adhesive (240, 270) to be lifted off of abutment (30), as shown in FIG. 6J. The surgeon may then remove any excess adhesive (240, 270) from prosthetic (230) or insert (200), fill any voids that might warrant filling, and perform any other finishing operations as may be desired. Once the surgeon determines that prosthetic (230) and insert (200) are suitably finished, the surgeon may position the combination of prosthetic (230), insert (200), and adhesive (240, 270) back onto abutment (30); then insert screw (220) back through passageway (250) to secure the combination of prosthetic (230), insert (200), and adhesive (240, 270) to abutment (30). Once the combination of prosthetic (230), insert (200), and adhesive (240, 270) has been suitably secured to abutment (30) via screw (222), the surgeon may add yet another amount of adhesive (280) into passageway (250) to fill passageway (250) as shown in FIG. 6K. The cured adhesive (280) may also be shaped using conventional instrumentation and techniques, in order to provide an uninterrupted occlusal surface (234) on prosthetic (230). At this stage, the process may be deemed complete, such that the patient may thereafter utilize the installed prosthetic (230) like a natural tooth.

While the foregoing examples all provide a fully coaxial relationship between implant (20) and all the components positioned above implant (20), other variations may provide a non-coaxial relationship between implant (20) and all the components positioned above implant (20). By way of example only, the foregoing teachings may be applied to scenarios where insert (50, 200) and prosthetic (60, 230) are oriented along a collective central axis that defines an angle of up to approximately 12 degrees, or even up to approximately 30 degrees, with the central axis of implant (20). In some such cases, abutment (30) may be configured to provide the oblique orientation relationship between implant (20) and the combination of insert (50, 200) and prosthetic (60, 230).

III. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus, comprising: (a) a dental prosthetic; (b) a metallic insert configured to be bonded in an interior of the dental prosthetic, the insert defining a passageway, the passageway of the insert being configured to receive a screw; and (c) a plastic cap member configured to be interposed between the insert and the interior of the dental prosthetic.

Example 2

The apparatus of Example 1, the dental prosthetic comprising a crown.

Example 3

The apparatus of Example 1, the dental prosthetic comprising a bridge.

Example 4

The apparatus of Example 1, the dental prosthetic comprising a denture.

Example 5

The apparatus of any one or more of Examples 1 through 4, the cap member comprising a shaft configured to fit in the passageway of the insert.

Example 6

The apparatus of Example 5, wherein the shaft is hollow.

Example 7

The apparatus of any one or more of Examples 5 through 6, the cap member further comprising a head, the shaft extending from the head, the head being configured to fit between an end of the insert and an inner surface in the interior of the dental prosthetic.

Example 8

The apparatus of any one or more of Examples 5 through 7, the shaft including a retention feature near a free end of the shaft.

Example 9

The apparatus of Example 8, the retention feature comprising an annular bump.

Example 10

The apparatus of any one or more of Examples 5 through 9, the shaft having a length configured to pass completely through the passageway and reach a bore of an abutment positioned adjacent to the insert.

Example 11

The apparatus of any one or more of Examples 1 through 4, the cap member comprising a plurality of exterior retention members.

Example 12

The apparatus of Example 11, the exterior retention members comprising downwardly-facing outer shelves.

Example 13

The apparatus of any one or more of Examples 1 through 4 or 11 through 12, the cap member comprising a nose portion defining a guide recess.

Example 14

The apparatus of Example 13, wherein the guide recess is configured to align with the passageway of the insert when the cap member is interposed between the insert and the interior of the dental prosthetic.

Example 15

The apparatus of any one or more of Examples 1 through 4 or 11 through 14, the cap member comprising a plurality of interior retention members.

Example 16

The apparatus of Example 15, the interior retention members comprising upwardly-facing inner shelves.

Example 17

The apparatus of any one or more of Examples 15 through 16, the insert further including a plurality of outer retention members, the interior retention members of the cap member being configured to engage the outer retention members of the insert to thereby secure the cap member to the insert.

Example 18

The apparatus of any one or more of Examples 1 through 17, the insert comprising titanium.

Example 19

The apparatus of any one or more of Examples 1 through 17, the insert comprising stainless steel.

Example 20

The apparatus of any one or more of Examples 1 through 19, the cap member comprising nylon.

Example 21

The apparatus of any one or more of Examples 1 through 19, the cap member comprising polyether ether ketone.

Example 22

The apparatus of any one or more of Examples 1 through 21, the cap member defining a guide channel configured to align with the passageway of the insert when the cap member is interposed between the insert and the interior of the dental prosthetic.

Example 23

The apparatus of Example 22, wherein the cap member defines a hollow shaft configured to fit in the passageway of the insert, the hollow shaft defining the guide channel.

Example 24

The apparatus of Example 22, wherein the cap member defines a nose portion configured to fit over an end of the guide channel, the nose portion defining the guide channel.

Example 25

A method comprising: (a) securing an implant in bone in a mouth of a patient; (b) securing an abutment to the implant; (c) positioning an insert on the abutment; (d) positioning a plastic cap member on the insert, such that the insert and the cap member form an assembly; and (e) securing a dental prosthetic to the assembly formed by the insert and the cap member.

Example 26

The method of Example 25, the dental prosthetic being secured to the assembly formed by the abutment and the cap member by an adhesive.

Example 27

The method of Example 26, the adhesive being selected from the group consisting of: acrylic, dental cement, and a composite.

Example 28

The method of any one or more of Examples 25 through 27, the insert being formed of metal.

Example 29

The method of any one or more of Examples 25 through 28, the act of positioning the plastic cap member on the insert comprising inserting a shaft of the cap member through a bore defined by the insert.

Example 30

The method of Example 29, wherein the shaft of the cap member is further inserted into a bore defined by the abutment.

Example 31

The method of any one or more of Examples 25 through 28, the act of positioning the plastic cap member on the insert comprising receiving the insert in a hollow interior defined by the cap member.

Example 32

The method of Example 31, wherein a plurality of internal engagement features in the hollow interior of the cap member engage a corresponding plurality of external engagement features of the insert.

Example 33

The method of any one or more of Examples 25 through 32, further comprising removing the dental prosthetic and the cap member from the abutment.

Example 34

The method of Example 33, wherein the insert is removed from the abutment with the dental prosthetic and the cap member.

Example 35

The method of Example 33, wherein the insert remains on the abutment when the dental prosthetic and the cap member are removed from the abutment.

Example 36

The method of Example 35, further comprising: (a) removing the cap member from the dental prosthetic, thereby exposing hardened adhesive in an interior region of the dental prosthetic; and (b) securing the dental prosthetic to the insert after removing the cap member from the dental prosthetic.

Example 37

The method of Example 36, the act of securing the dental prosthetic to the insert after removing the cap member from the dental prosthetic comprising applying additional adhesive between an exterior of the insert and the hardened adhesive in the interior region of the dental prosthetic.

Example 38

The apparatus of any one or more of Examples 33 through 37, further comprising forming an opening through the dental prosthetic, wherein the act of forming an opening comprises inserting a drill bit through a guide passageway defined by the cap member.

Example 39

The apparatus of Example 38, wherein the opening formed through the dental prosthetic passes through an occlusal surface of the dental prosthetic.

Example 40

The apparatus of any one or more of Examples 30 through 39, further comprising: (a) positioning the dental prosthetic back over the abutment, with the insert being interposed between the dental prosthetic and the abutment; (b) inserting a screw through the opening in the dental prosthetic; and (c) securing the dental prosthetic and insert relative to the abutment with the screw.

IV. MISCELLANEOUS

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:
1. An apparatus, comprising:
(a) a dental prosthetic;
(b) a metallic insert configured to be bonded in an interior of the dental prosthetic, the insert defining a passageway, the passageway of the insert being configured to receive a screw;
(c) an abutment configured to be removably secured to the insert and defining a channel; and
(d) a plastic cap member configured to be interposed between the insert and the interior of the dental prosthetic and to prevent bonding material from entering the channel of the abutment, the cap member comprising a nose portion defining a guide recess.
2. The apparatus of claim 1, the cap member further comprising:
(i) a hollow shaft configured to fit in the passageway of the insert, and
(ii) a head, the shaft extending from the head, the head being configured to fit between an end of the insert and an inner surface in the interior of the dental prosthetic.

3. The apparatus of claim 2, the shaft having a length configured to pass completely through the passageway and reach a bore of the abutment positioned adjacent to the insert.
4. The apparatus of claim 1, the cap member further comprising a plurality of annular flanges.
5. The apparatus of claim 4, the plurality of annular flanges comprising downwardly-facing outer shelves.
6. The apparatus of claim 1, wherein the guide recess is configured to align with the passageway of the insert when the cap member is interposed between the insert and the interior of the dental prosthetic.
7. The apparatus of claim 1, the cap member further comprising a plurality of upwardly-facing inner shelves.
8. The apparatus of claim 7, the insert further including a plurality of annular flanges, the plurality of upwardly-facing inner shelves of the cap member being configured to engage the annular flanges of the insert to thereby secure the cap member to the insert.
9. The apparatus of claim 1, the insert comprising titanium.
10. The apparatus of claim 1, the cap member further comprising nylon.
11. The apparatus of claim 1, the cap member further comprising polyether ether ketone.
12. The apparatus of claim 1, the cap member defining a bore configured to align with the passageway of the insert when the cap member is interposed between the insert and the interior of the dental prosthetic.
13. The apparatus of claim 12, wherein the cap member defines a hollow shaft configured to fit in the passageway of the insert, the hollow shaft defining the bore.
14. The apparatus of claim 12, wherein the nose portion is configured to fit over an end of the bore, the nose portion defining the bore.
15. An apparatus, comprising:
(a) a dental prosthetic;
(b) an insert configured to be bonded in an interior of the dental prosthetic, the insert defining a passageway, the passageway of the insert being configured to receive a screw;
(c) an abutment configured to be removably secured to the insert and defining a channel;
(d) an implant configured to be removably secured to the abutment; and
(e) a plastic cap member configured to be interposed between the insert and the interior of the dental prosthetic and to prevent bonding material from entering the channel of the abutment, cap member comprising a plurality of annular flanges, the plurality of annular flanges comprising downwardly-facing outer shelves.
16. The apparatus of claim 15, the implant including threads configured to be axially aligned with the channel of the abutment, the apparatus further comprising a bolt configured to screw into the threads of the implant to thereby secure the abutment to the implant.
17. The apparatus of claim 15, further comprising a screw, wherein the screw is configured secure the insert to the abutment.
18. An apparatus, comprising:
(a) a dental prosthetic;
(b) an insert configured to be bonded in an interior of the dental prosthetic, the insert defining a passageway;
(c) an abutment configured to be removably secured to the insert and defining a channel;
(d) a plastic cap member configured to be interposed between the insert and the interior of the dental prosthetic, the cap member comprising a plurality of upwardly-facing inner shelves; and (e) a screw configured to secure the insert and the plastic cap to the abutment.

* * * * *